(12) United States Patent
Nguyen et al.

(10) Patent No.: US 6,311,267 B1
(45) Date of Patent: Oct. 30, 2001

(54) JUST-IN-TIME REGISTER RENAMING TECHNIQUE

(75) Inventors: Dung Quoc Nguyen; Hung Qui Le, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/196,908

(22) Filed: Nov. 20, 1998

(51) Int. Cl.⁷ .................................................. G06F 9/38
(52) U.S. Cl. .............................. 712/217; 712/219
(58) Field of Search ................................. 712/216, 217, 712/218, 219, 228, 23

(56) References Cited

U.S. PATENT DOCUMENTS

| 4,992,938 | | 2/1991 | Cocke et al. ........................ 712/217 |
|---|---|---|---|
| 5,497,499 | | 3/1996 | Garg et al. ............................ 712/217 |
| 5,625,837 | * | 4/1997 | Popescu et al. ........................ 712/23 |
| 5,630,149 | | 5/1997 | Bluhm ................................... 712/217 |
| 5,673,427 | | 9/1997 | Brown et al. ........................ 712/245 |
| 5,699,538 | | 12/1997 | Le et al. ................................. 712/23 |
| 5,708,841 | | 1/1998 | Popescu et al. ........................ 712/23 |
| 5,758,117 | * | 5/1998 | Patel et al. ............................ 712/217 |
| 5,872,950 | * | 2/1999 | Levitan et al. ........................ 712/217 |
| 5,872,985 | * | 2/1999 | Kimura ..................................... 712/1 |
| 5,944,812 | * | 8/1999 | Walker .................................. 712/23 |

* cited by examiner

Primary Examiner—Eddie Chan
Assistant Examiner—Gautam R. Patel
(74) Attorney, Agent, or Firm—Anthony V. S. England; Casimer K. Salys (57) ABSTRACT

A target register of an instruction is assigned a rename register in response to the instruction being issued. That is, the target register is renamed at issue time, not at dispatch time. To handle a new deadlock issue this gives rise to, rename register allocation/deallocation logic, according to the present invention, includes logic for allocating and deallocating two sets of rename registers, one set from a regular rename buffer and another set from an overflow rename buffer. According to this allocation/deallocation logic, if the oldest dispatched, noncompleted instruction is ready for assignment of a rename register and the regular rename buffer is full, then a rename register is assigned from the overflow rename buffer to this instruction.

11 Claims, 12 Drawing Sheets

Figure 4A:
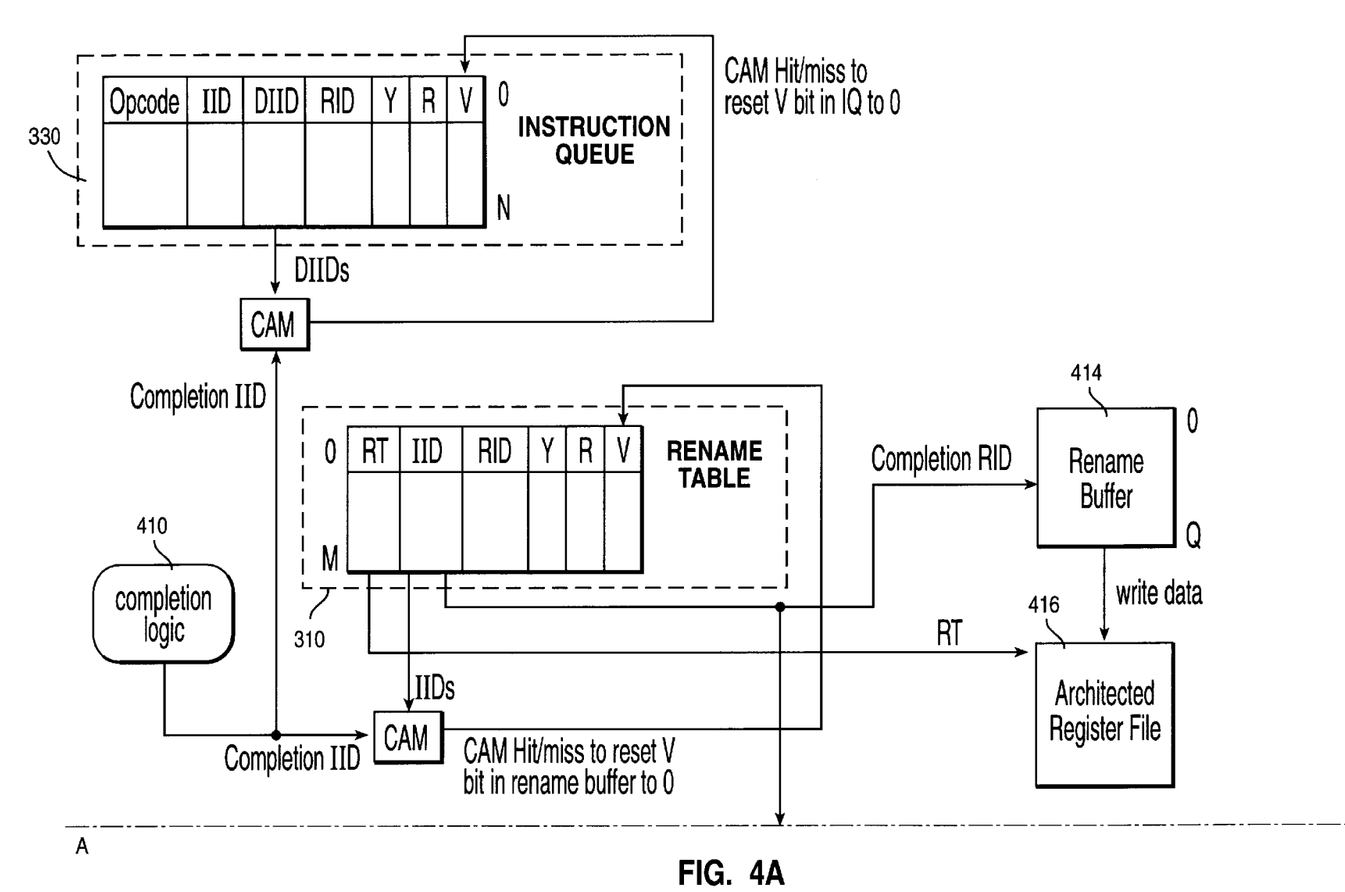
FIG. 4 shows data flow at completion.

**At completion time, Completion IID is used to access the rename table. At CAM matched location, read out RT and RID. The RT field (architected target register) will be used as the write address to the architected register file. The RID (Rename ID) will be used as the read address to the rename buffer. The data from the rename buffer is then read out and written into the architected register. RID is also sent to a RID de-allocation logic whereby the renamed ID is de-allocated and then can be reused by the new instruction. The V bit of that entry in the rename table and IQ are also reset to 0.

JUST-IN-TIME REGISTER RENAMING TECHNIQUE

TECHNICAL FIELD

This invention relates generally to data processing systems and more specifically applies to recovery mechanisms for such systems, particularly where the system includes a processor that is superscalar or has a pipelined execution unit.

BACKGROUND OF THE INVENTION

Currently, register renaming techniques employ a mechanism where the target register of an instruction is assigned a temporary rename buffer during the instruction dispatch cycle of that instruction. This instruction will hang on to the temporary buffer from the dispatch time until it is completed by the machine; which locks up rename resources for a long time (i.e. if the instruction is a load that misses L1 or L2 caches). A load miss in a cache is a typical event, for example, which looks up rename resources for a long time. Thus, a need exists for improved renaming.

SUMMARY OF THE INVENTION

The foregoing need is addressed by the present invention, as follows.

A target register of an instruction is assigned a rename register in response to the instruction being issued. That is, the target register is renamed at issue time, not at dispatch time.

A new deadlock issue arises due to the present invention because of a potential race among instructions. That is, instructions are dispatched in program order, and in the prior art each instruction needing a rename register is assigned a rename register at dispatch; therefore, according to the prior art it is not possible for a deadlock to occur wherein younger instructions consume all available rename registers, and an older instruction is unable to be dispatched for lack of a rename register. However, according to the present invention, instructions are dispatched in program order, but are not assigned a rename register until issue time. Furthermore, issuance depends on availability of source operands, and completion is in program order. Therefore, one aspect of the present invention involves a recognition that without adequate rename register and allocation/deallocation resources it would be possible for a deadlock to occur. That is, if younger instructions were issued before older instructions to the extent of consuming all rename registers, this would prevent issuance of an older instruction for lack of a rename register. If an instruction cannot be issued, it cannot complete. Therefore, completion in program order would be impossible if an oldest instruction could not be issued for lack of a rename register. To avoid this potential deadlock, rename register allocation/deallocation logic, according to the present invention, includes logic for allocating and deallocating two sets of rename registers, one set from a regular rename buffer and another set from an overflow rename buffer. According to this allocation/deallocation logic, an oldest instruction currently being processed in the processor is identified as an instruction which is next to be completed. If this oldest instruction is still in the instruction queue and the regular rename buffer is full, then a rename register is assigned from the rename overflow buffer to this instruction, so the instruction can execute.

Advantages of the present invention include allowing the rename buffer to remain free until it is ready to be consumed by the execution engines, and avoiding a rename buffer being held for a long time by an instruction that is not ready to be executed. Consequently, more rename registers are freed for younger instructions to be dispatched and executed. But deadlock is avoided, because rename registers are not permitted to be assigned to younger instructions to an extent that younger instructions consume all available rename registers.

DETAILED DESCRIPTION OF THE PREFERRED EMBODIMENT

Figure 1:
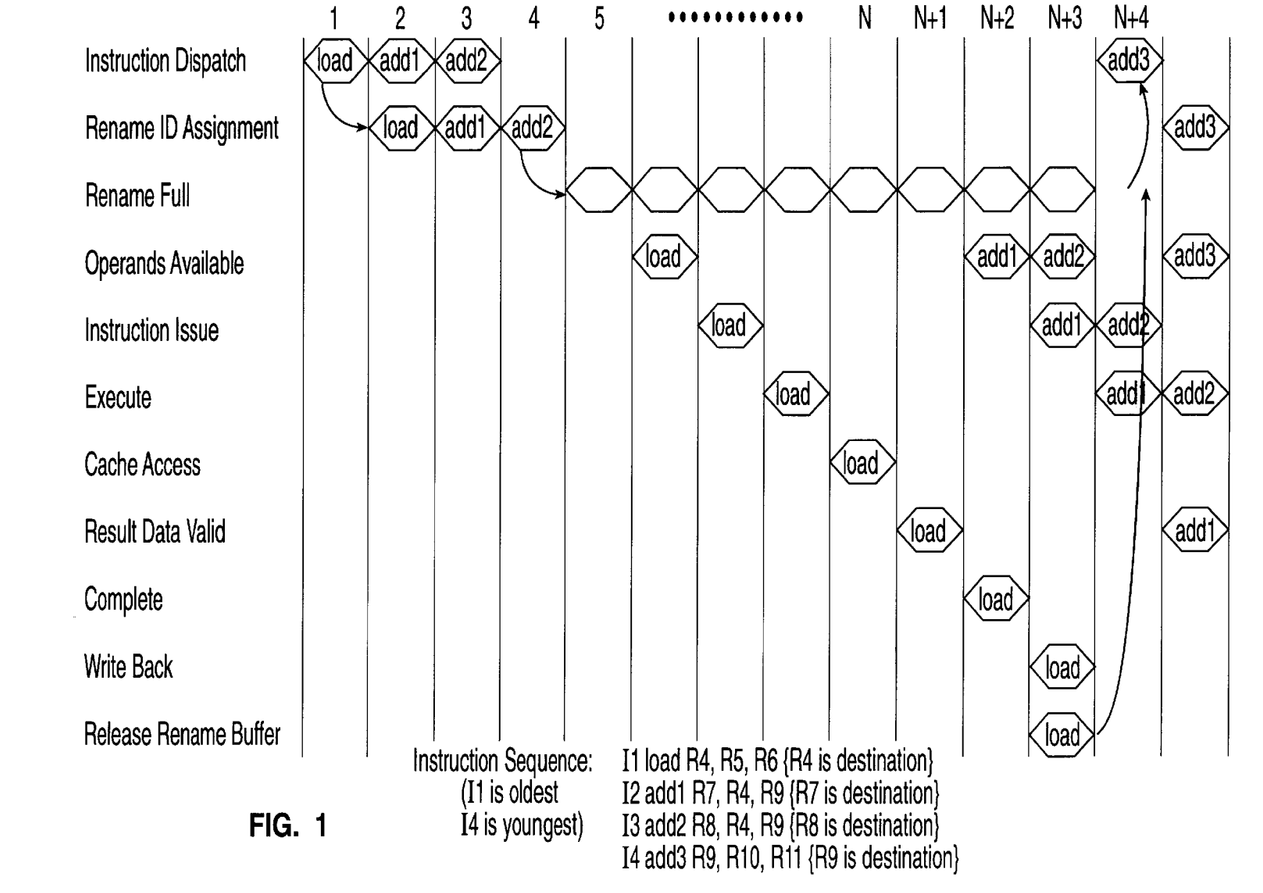
FIG. 1 is a timing diagram for a load miss causing delay in execution of another nondependent instruction because the load instruction locks up the rename buffer while a nondependent add cannot be dispatched because the temporary rename buffer is full.
Figure 2:
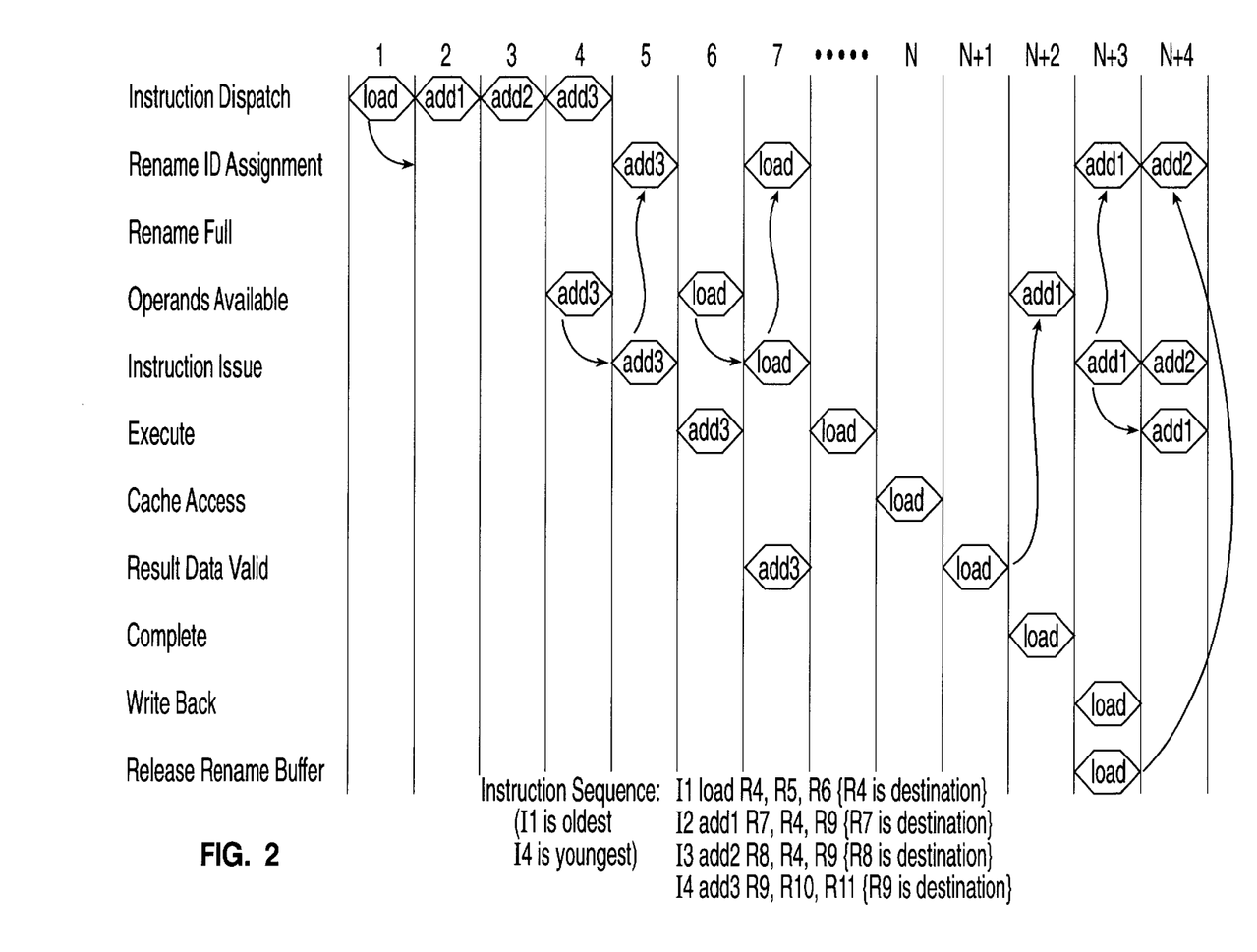
FIG. 2 is a timing diagram for just-in-time register renaming.

A sequence of instructions will first be shown, in FIG's 1 and 2, to illustrate certain timing aspects of the embodiment. FIG. 1. shows a dispatched add2 instruction which causes the rename buffer to be full upon assignment of rename identifier for the I3 instruction, add2, at time 4. The add2 depends on completion of instruction I1, the load instruction, for one of the add2 operands, so the add2 instruction is stalled until time N+3. This, in turn, blocks the dispatch of the add3 instruction until time N+4, when the load instruction is completed and the rename resource has been released. Note that instruction I4, the add3 instruction, is not dependent on I1, I2, or I3, but because of the dependency of I3 on I1, and the use of the last available rename identifier by the I3 instruction, I4 dispatch is delayed until I1 completion, etc.

FIG. 2 shows the same code sequence as shown in FIG. 1. According to the present exemplary embodiment, the target registers of the I1 through I3 instructions, load, add1, and add2, are not assigned any rename registers during dispatch. Consequently, the I4 instruction, add3, is now allowed to execute much earlier, since the rename buffer is not full when the add3 is dispatched. When the add3 is dispatched, its operands are checked for availability. Since add3 is not dependent on any instruction (i.e. all its operands are available), it is selected to be issued in cycle 5. At this time (i.e. issue cycle), the target register of add3 is renamed (i.e. rename ID assignment). Add3 is then executed in cycle 6. In cycle 6, load operands are also available. In cycle 7 the load instruction is selected to be issued, and its target register is then renamed. Instruction I2 (which depends on the load instruction) is not renamed until cycle N+3.

In summary, add3 is allowed to execute much earlier than the load instruction, as compared to the normal rename cases shown in FIG. 1. That is, for the example of FIG. 2, according to the present embodiment, the rename buffer remains unfilled. This is in contrast to the example of opposed FIG. 1, where the rename buffer is full in cycle 5 after instruction add2 is dispatched, and the rename buffer being full blocks add3 from being dispatched.

Figure 9:
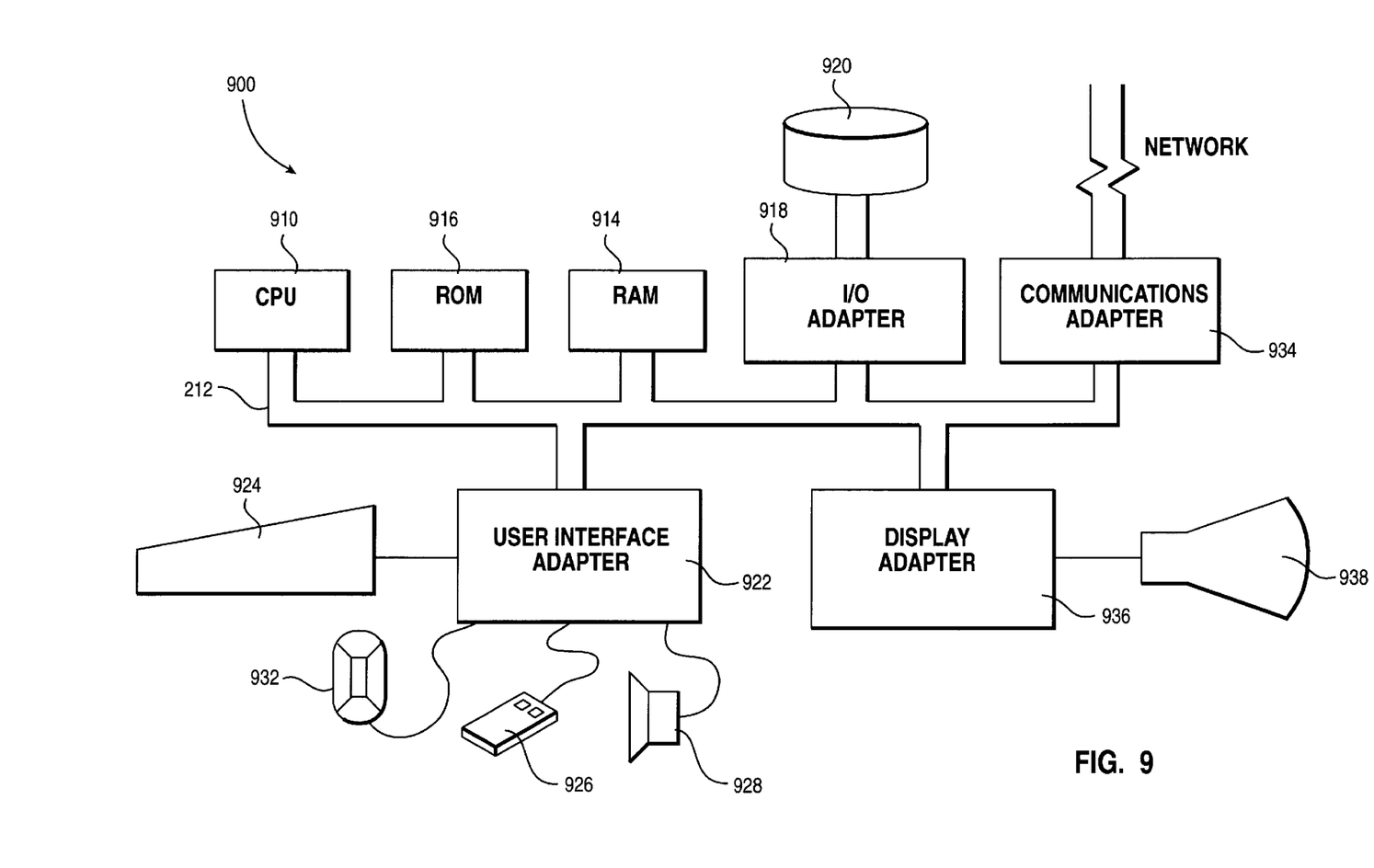
FIG. 9 is a block diagram of a system for the embodiment.

Next, certain structural and functional aspects of a data processing system for the embodiment will be introduced. Referring to FIG. 9, an example is shown of a data processing system 900 which may be used for the invention. The system has a central processing unit (CPU) 910, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor User's Manual", 1994, IBM Corporation, which is hereby incorporated herein by reference. The allocation logic 320, rename table 310 and rename buffer 414 (not shown) of the present invention are included in CPU 910. The CPU 910 is coupled to various other components by system bus 912. Read only memory ("ROM") 916 is coupled to the system bus 912 and includes a basic input/output system ("BIOS") that controls certain basic functions of the data processing system 900. Random access memory ("RAM") 914, I/O adapter 918, and communications adapter 934 are also coupled to the system bus 912. I/O adapter 918 may be a small computer system interface ("SCSI") adapter that communicates with a disk storage device 920. Communications adapter 934 interconnects bus 912 with an outside network enabling the data processing system to communication with other such systems. Input/Output devices are also connected to system bus 912 via a user interface adapter 922 and display adapter 936. Keyboard 924, track ball 932, mouse 926 and speaker 928 are all interconnected to bus 912 via user interface adapter 922. Display monitor 938 is connected to system bus 912 by display adapter 936. In this manner, a user is capable of inputting to the system throughout the keyboard 924, trackball 932 or mouse 926 and receiving output from the system via speaker 928 and display 938. Additionally, an operating system such as AIX ("AIX" is a trademark of the IBM Corporation) is used to coordinate the functions of the various components shown in FIG. 9.

The CPU (or "processor") 910 includes various registers, buffers, memories, and other units formed by integrated circuitry, and operates according to reduced instruction set computing ("RISC") techniques. The CPU 910 processes according to processor cycles, synchronized, in some aspects, to an internal clock (not shown).

In the following, emphasis is placed on interruptions arising from speculative execution of instructions. However, as mentioned previously, an interruption may also be caused by an unusual condition arising in connection with instruction execution, error, or signal external to the processor 910. For example, such an interruption may be caused by 1) attempting to execute an illegal or privileged instruction, 2) executing an instruction having an invalid form, or an instruction which is optional within the system architecture but not implemented in the particular system, or a "System Call" or "Trap" instruction, 3) executing a floating-point instruction when such instructions are not available or require system software assistance, 4) executing a floating-point instruction which causes a floating-point exception, such as due to an invalid operation, zero divide, overflow, underflow, etc., 5) attempting to access an unavailable storage location, including RAM 914 or disk 920, 6) attempting to access storage, including RAM 914 or disk 920, with an invalid effective address alignment, or 7) a System Reset or Machine Check signal from a device (not shown) directly connected to the processor 910 or another device in the system 900 connected to the processor 910 via the bus 912. These conditions are discussed further in the above references, "The PowerPC Architecture: A Specification for a New Family of RISC Processors", and "PowerPC 604 RISC Microprocessor User's Manual".

Next, certain structural and functional aspects of a processor for the embodiment will be introduced. A superscalar processor has multiple elements which operate in parallel to process multiple instructions in a single processing cycle. Pipelining involves processing instructions in stages, so that the pipelined stages may process a number of instructions concurrently.

In a first stage, referred to as an "instruction fetch" stage, an instruction is fetched from memory. Then, in a "decode" stage, the instruction is decoded into different control bits, which in general designate i) a type of functional unit for performing the operation specified by the instruction, ii) source operands for the operation and iii) destinations for results of operations. Next, in a "dispatch" stage, the decoded instruction is dispatched per the control bits to a unit having an "issue" stage. Once the operands are available for the dispatched instruction, the issue stage issues the instruction to an appropriate functional unit having an "execution" stage. This stage processes the operation as specified by the instruction. Executing an operation specified by an instruction includes accepting one or more operands and producing one or more results.

A "completion" stage deals with program order issues that arise from concurrent execution, wherein multiple, concurrently executed instructions may deposit results in a single register. It also handles issues arising from instructions subsequent to an interrupted instruction depositing results in their destination registers. In the completion stage an instruction waits for the point at which there is no longer a possibility of an interrupt so that depositing its results will not violate the program order, at which point the instruction is considered "complete", as the term is used herein. Associated with a completion stage, there are buffers to hold execution results before results are deposited into the destination register, and buffers to backup content of registers at specified checkpoints in case an interrupt needs to revert the register content to its pre-checkpoint value. Either or both types of buffers can be employed in a particular implementation. At completion, the results of execution in the holding buffer will be deposited into the destination register and the backup buffer will be released.

While instructions for the processor may originally be prepared for processing in some programmed, logical sequence, it should be understood that they may be processed, in some respects, in a different sequence. However, since instructions are not totally independent of one another, complications arise. That is, the processing of one instruction may depend on a result from another instruction. For example, the processing of an instruction which follows a branch instruction will depend on the branch path chosen by the branch instruction. In another example, the processing of an instruction which reads the contents of some memory element in the processing system may depend on the result of some preceding instruction which writes to that memory element.

As these examples suggest, if one instruction is dependent on a first instruction and the instructions are to be processed concurrently or the dependent instruction is to be processed before the first instruction, an assumption must be made regarding the result produced by the first instruction. The "state" of the processor, as defined at least in part by the content of registers the processor uses for execution of instructions, may change from cycle to cycle. If an assumption used for processing an instruction proves to be incorrect then, of course, the result produced by the processing of the instruction will almost certainly be incorrect, and the processor state must recover to a state with known correct results up to the instruction for which the assumption is made. (Herein, an instruction for which an assumption has been made is referred to as an "interruptible instruction", and the determination that an assumption is incorrect, triggering the need for the processor state to recover to a prior state, is referred to as an "interruption" or an "interrupt point".) In addition to incorrect assumptions, there are other causes of such interruptions requiring recovery of the processor state. Such an interruption is generally caused by an unusual condition arising in connection with instruction execution, error, or signal external to the processor.

According to the terminology used herein, when an instruction performs an operation affecting the contents of a register, the operation is said to "target" that register, the instruction may be referred to as a "targeting instruction", and the register is referred to as a "target register" or a "targeted register". For example, the instruction "ld r3, . . ." targets register r3, and r3 is the target register for the instruction "ld r3, . . .".

Figure 10:
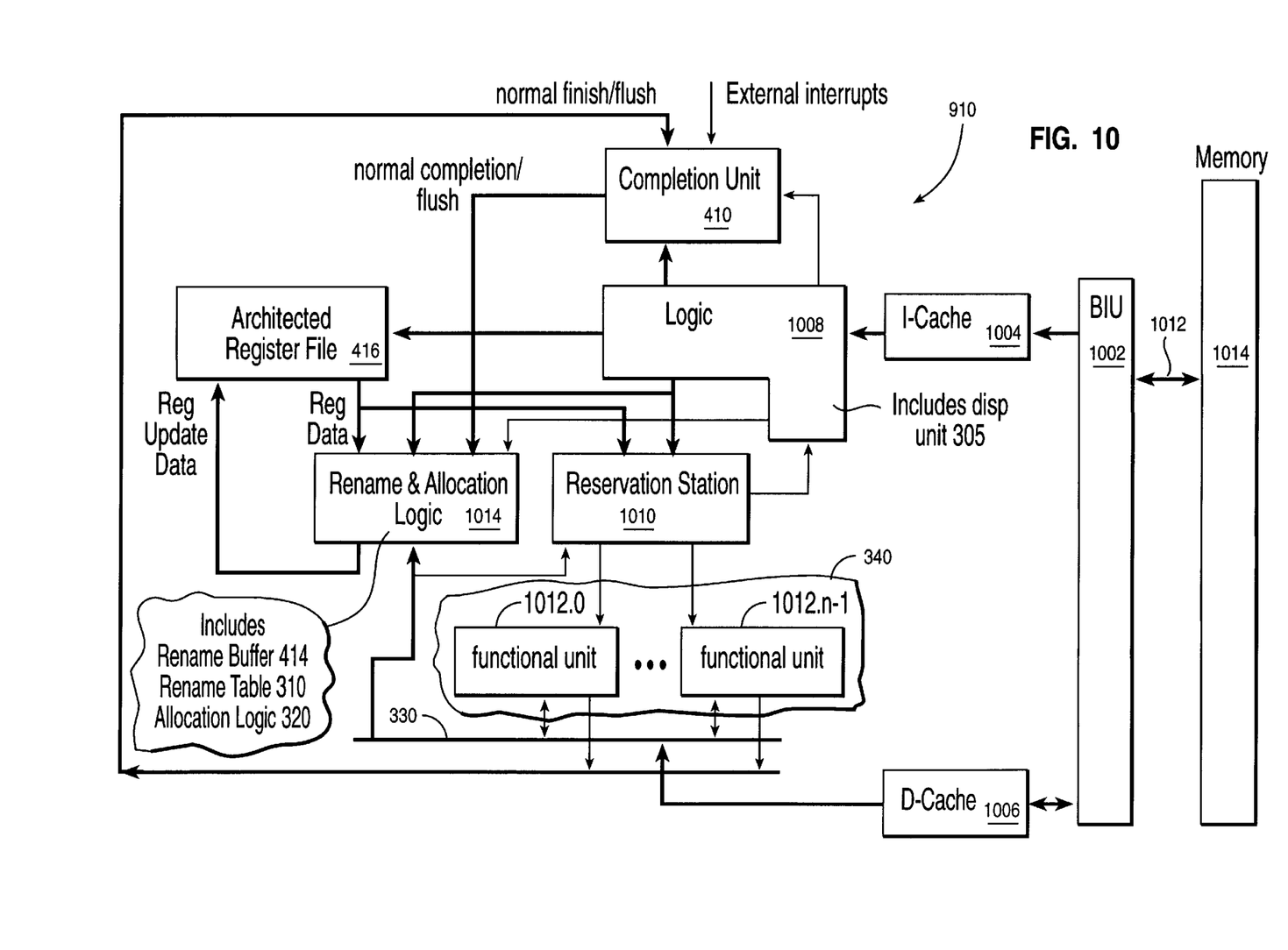
FIG. 10 is a block diagram of a CPU for the embodiment.

Referring to FIG. 10, a block diagram of a superscalar processor as described above is shown for the preferred embodiment of the invention. (Note that herein a numbered element is numbered according to the figure in which the element is introduced, and is referred to by that number throughout succeeding figures.) Processor 910 has a bus interface unit 1002 coupled to the bus 912 for controlling transfers of data and instructions between memory, such as random access memory 914, and caches 1004 and 1006.

Instructions are processed in processor 910 in a sequence of logical, pipelined stages, as has been previously described; however, it should be understood that some of the functions of these stages, as implemented in the preferred embodiment, may be merged together, so that this particular division of stages should not be taken as a limitation, unless a such limitation is indicated in the claims herein. Indeed, some of the previously described stages are indicated as a single logic unit 1008 in FIG. 10 for the sake of simplicity of understanding and because each distinction between stages is not necessarily central to the present invention.

Logic 1008 in FIG. 10 includes dispatch unit 305, fetch, branch processing, instruction buffer, and decode units. The logic 1008 fetches instructions from instruction cache 1004 into the instruction buffer, either based on a known sequence of the instructions or, in the case of a sequence having a conditional branch instruction, a predicted sequence, the predicted sequence being in accordance with addresses selected by the branch processing unit. The logic 1008 also decodes the instructions and dispatches them to a reservation station 1010, which includes an instruction queue 330 from which the instructions are issued to appropriate functional units 1012.0, 1012.1, . . . 1012.n-1. In executing the instructions, the units 1012 input and output information to logic 1014 and IQ 330. The functional units 1012 signal the completion unit 410 upon execution of instructions and the completion unit 410 retires the instructions, which includes notifying allocation logic 320, rename buffer 414 and rename table 310 in logic 1014. The functional units 1012 also assert results on one or more result buses 1030 so that the results may be written to the logic 1014 and IQ 330. In addition to notifying the allocation logic 320, etc. about retired instructions, the completion unit 410 or logic unit 1008 also notifies the allocation logic 320 about exception conditions and mispredicted branches for which instructions should be discarded prior to completion and for which a state of the processor 10 should be recovered. The allocation logic etc. also receives other information about dispatched instructions from the logic unit 1008, the register file 416, and one or more functional units 1012, relevant aspects of which will be described below. For the preferred embodiment described herein, instructions are dispatched in program order.

Figure 3A:
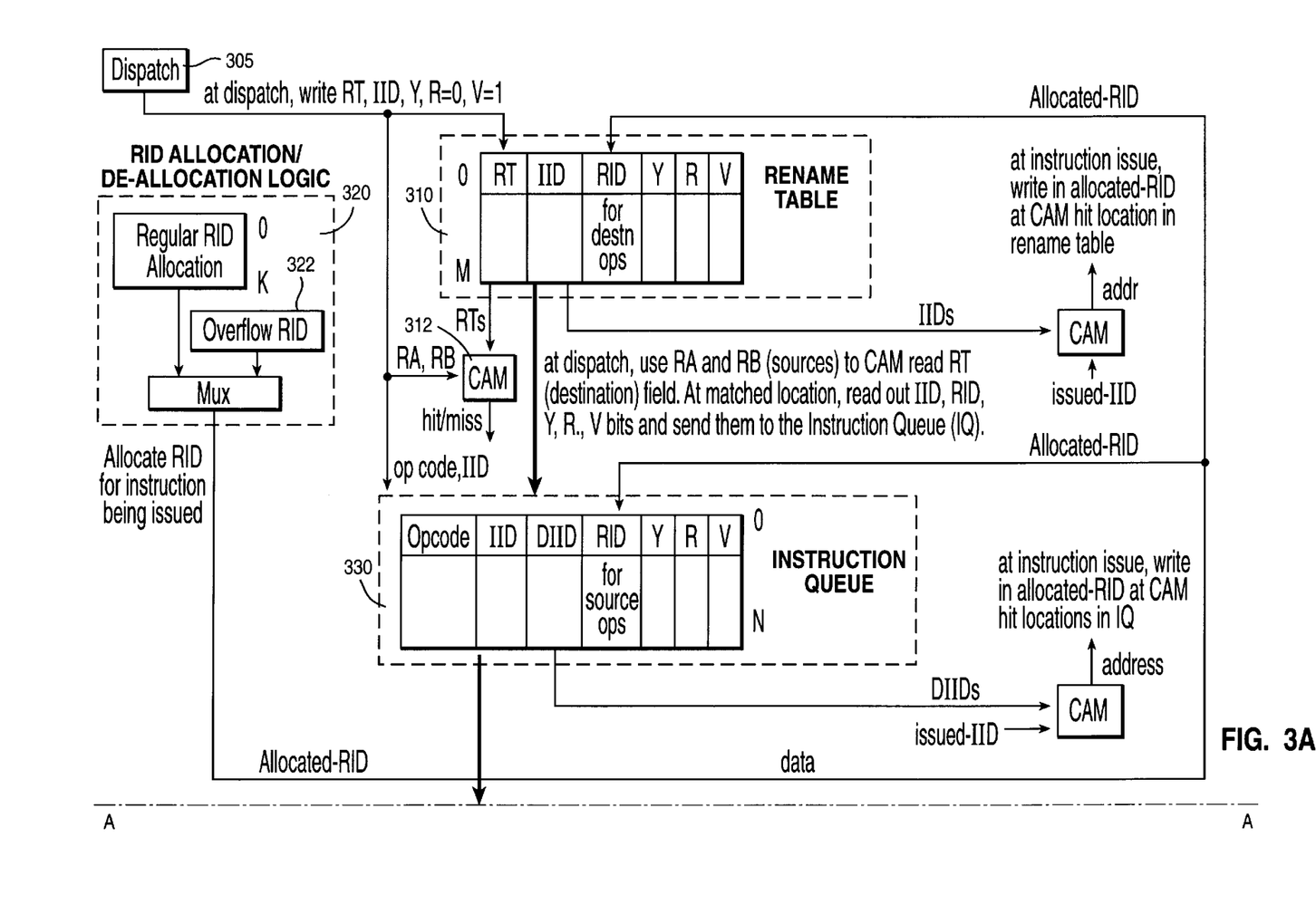
FIG. 3 shows data flow at dispatch and execution.
Figure 3B:
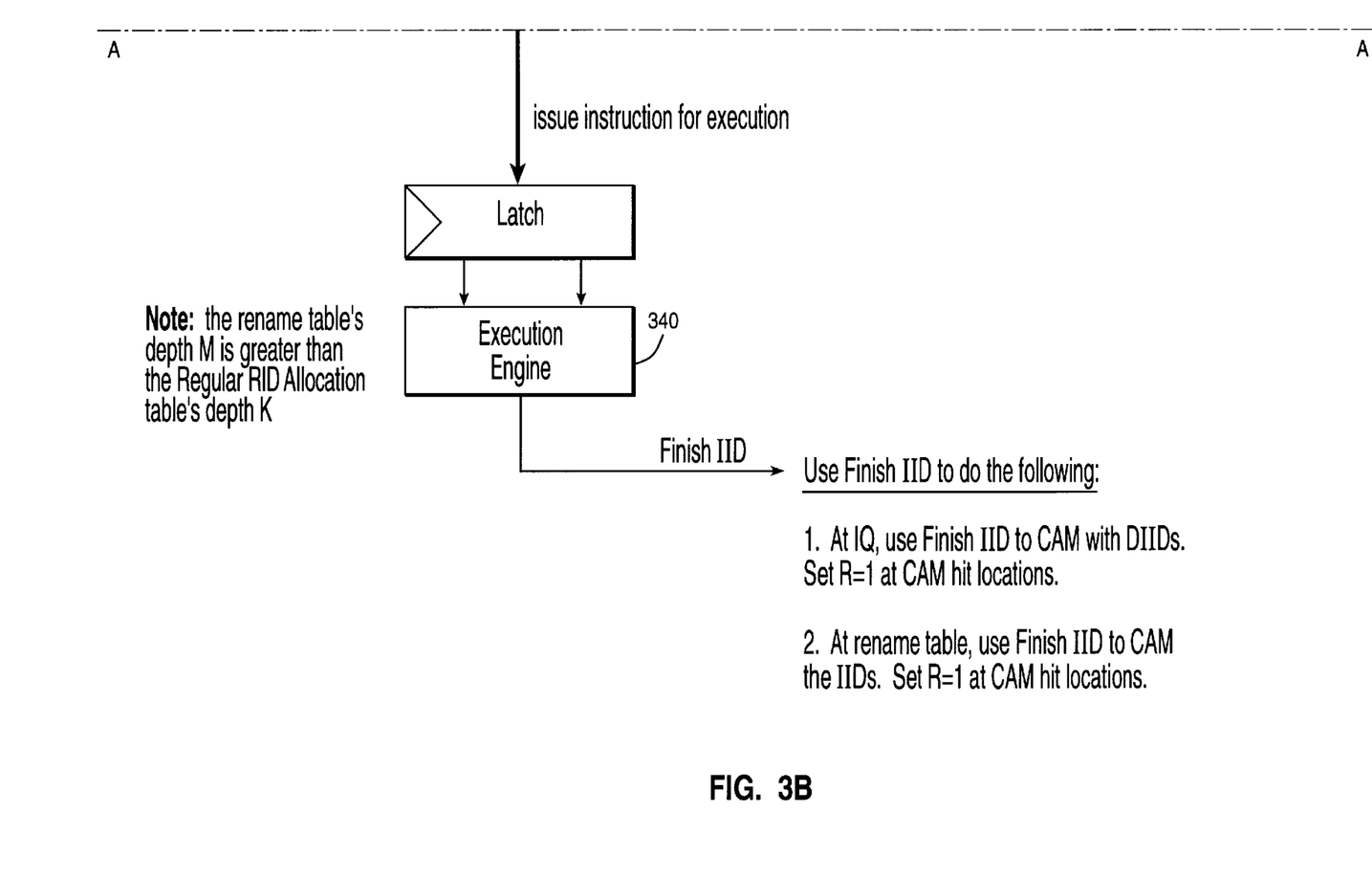
Figure 4B:
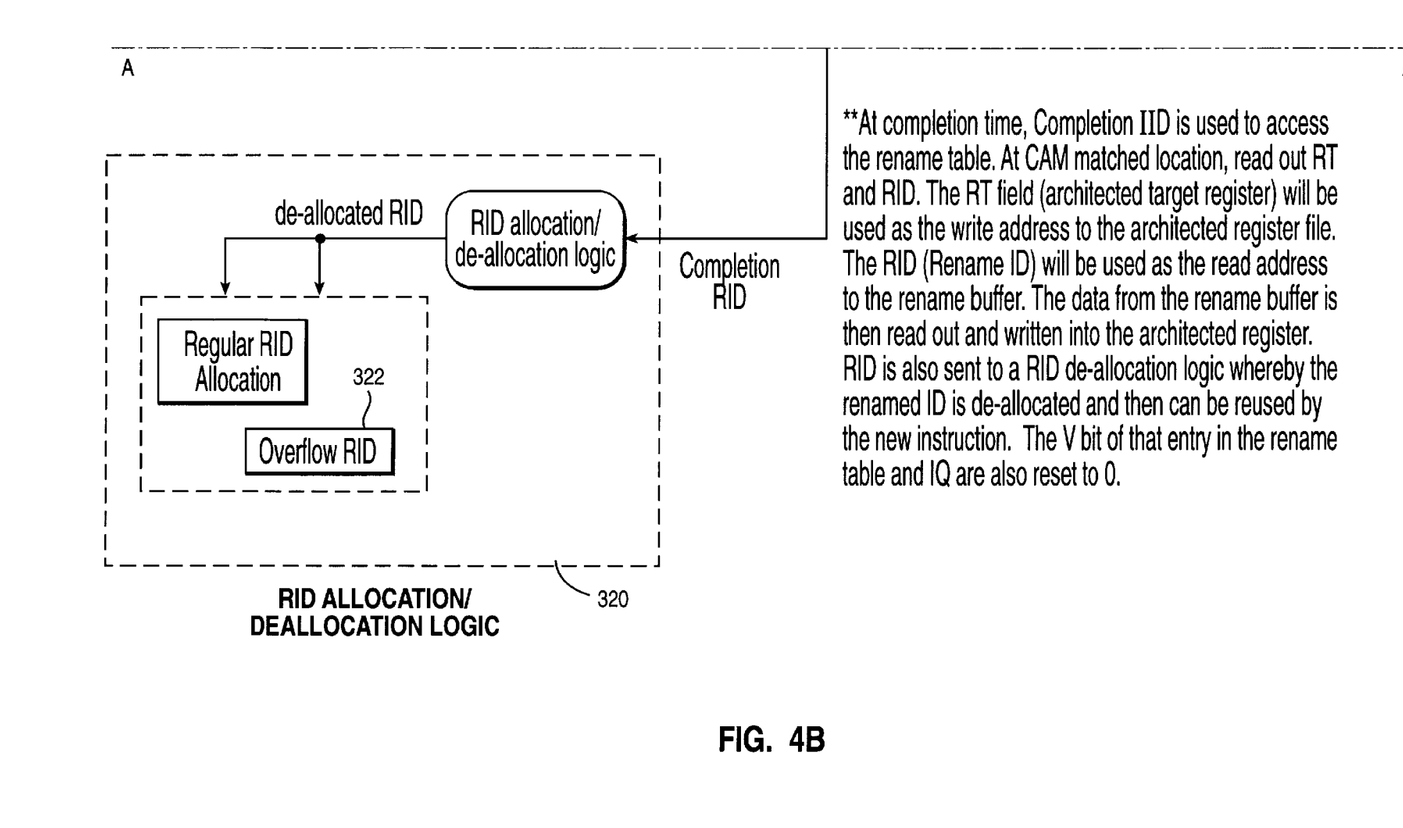

Next, more detailed functional and structural aspects of the embodiment will be shown in a block diagram format in FIG's 3 and 4. For these FIG's, the fields depicted are as follows:

RT=architected target register of an instruction.

RA, RB=source registers (operands) of an instruction.

IID=instruction ID

DIID=dependent IID. This field indicates the IID on which this instruction depends for its data. It is taken directly from the IID read out of the rename table (i.e. rename IID→instruction queue DIID). There will be a DIID associated with each of the operands (i.e. RA will have RA's DIID and RB will have RB's DIID, and these two IID may or may not be the same).

RID=Rename buffer ID, this ID points to the location in the rename buffer to which this instruction RT is assigned.

Y=young bit, this bit indicates the youngest RT in this rename table. If Y=1, then this RT is youngest.

R=data in rename buffer bit. When R=1, then the data is in the rename buffer. When R=0, then the data is in one of the execution units.

V=entry valid bit. When V=1, then the data is being renamed (it could either be in the rename buffer or in one of the execution units). When V=0, then the data is in the architected register file.

CAM=Content Addressable Memory (i.e. read by compares) Regular RID Allocation=this logic allocates one of the rename buffer to an instruction that being issued by the instruction queue. It may have P entries.

Overflow RID=this logic allocates one rename buffer to the instruction being issued if this instruction is the next instruction to be completed AND the RID Allocation logic is full. If the RID Allocation is unfilled, then the said instruction will be renamed by the RID Allocation logic. It contains 1 entry.

Referring now to FIG. 3, when an instruction is dispatched, entries are created for the instruction in the rename table 310 and the instruction queue (aka "IQ" or "Issue Queue"). That is, the instruction's RT is written into the rename table 310, its op code is written into the IQ 330, and its IID is written into both the rename table and the IQ. The RT and IID fields are taken directly from the instruction from dispatch. The R bit is set to 0 to indicate that the instruction has not been executed yet, and the data will be in one of the execution units. The V bit is set to 1 to indicate that this instructions RT has been renamed, and the data is not in the architected register. The Y bit for the rename table entry is set to 1 to indicate that this RT is the youngest RT field in the machine. The incoming RT is also used to search the whole rename table for other RT with the same values; if there are RT matches, then the Y bits of the older RTs in the rename table is reset to 0. This Y bit is used when multiple RTs with the same values are dispatched and the incoming instruction must know that it only depends on the youngest RT in the machine.

In addition to the above reference information being written into the rename table 310 and the IQ 330, there is a concurrent search of the RT field of the rename table in order to determine where source data will come from. That is, there is a CAM 312 compare of the rename table RT field with the currently dispatching instruction's source registers, RA and RB, for example. At any matched locations, the Y bit is examined. If there are multiple matches (i.e. there are several RTs in the rename table that match the RA or RB fields), then the RT field with the Y=1 is the true match. The IID, RID, Y, R, and V bits from that location are read out and sent to the instruction queue 330. Such a rename IID sent to the IQ is stored in the DIID (dependent IID) field in the IQ for the currently dispatched instruction, since it identifies an instruction which generates source data for the currently issuing instruction having the IID in the rename table. Thus, for an IID identified instruction in the IQ, the one or more RID's in the IQ identify the one or more rename registers for source operands, and the Y, V and R bits in the IQ describe the status of the respective instructions generating such source operands.

Once dispatched to the IQ, an instruction is checked to see if all of its operands are available. If all of its operands are available, and if it is selected to be issued for execution, then its RT (target register) is assigned an RID if the rename buffer is unfilled. If the rename buffer is full, then the target register cannot be renamed, and the instruction will not be issued for execution and will be held in the IQ until the rename buffer becomes unfilled and starts assigning RID again.

A deadlock issue arises because of a potential execution race among instructions. That is, if younger instructions execute before the older instruction can execute, and the younger instructions thereby consume all available rename buffers, the oldest instruction in the machine would be unable to execute for lack of a rename register. Therefore, Rename Overflow Buffer 322 is employed in RID Allocation/Deallocation Logic 320. According to the Allocation/Deallocation Logic 322, when an instruction is still in the IQ and the regular rename buffer is full and it is next to be completed (i.e. oldest instruction in the machine), then the Rename Overflow Buffer 322 will assign a RID to this instruction to allow it to execute. However, if an instruction is still in the IQ and it is next to be completed but the regular rename buffer is unfilled, then the Regular RID Allocation logic will assign it a RID (this RID will be called allocated-RID). The IID of the instruction that is being issued (this IID will be called issuing-IID) will be sent to both the IQ and the rename table. At the IQ, the issuing IID will be used to compare with all of the DIIDs in the IQ and at any matched location, the allocated-RID will be latched in. At the rename table, the issuing-IID will be used to compare with all of the IIDs in the rename table and at any matched location, the allocated-RID will be latched in.

After receiving a RID, the instruction is allowed to execute. When the execution engine 340 finishes executing an instruction, it will send back the Finish IID of the instruction that it was working on to the IQ and the rename table. At the IQ, the Finish IID will be used to compare with all of the DIIDs in the IQ. At any matched location, the R bit will set to 1 to indicate the data is now residing in the rename buffer. At instruction issue time, the RID will be used to access the rename buffer to get its data (i.e. RID is now the source pointer for an operand, and it is pointing to one of the location in the rename buffer). At the rename table, the Finish ID will be used to compare with all of the IIDs in the rename table. At any matched location, the R bit will set to 1 to indicate the data now resides in the rename buffer. At instruction dispatch time, the RID will be read out and sent to the IQ.

At instruction completion time, the Completion IID is sent out by the completion unit 410 to the IQ 330, rename table 310, and RID de-allocation logic 320. At the IQ, the Completion IID is used to compare with all of the DIIDs in the IQ. At any matched location, the V bit of that operand will be reset to 0 to indicate that the data for this operand is now residing in the architected register file (note: this V bit is not the instruction queue entry valid bit). At the rename table, the Completion IID is used to compare with all of the IIDs in the rename table. At any matched location, the V bit will be reset to 0 to indicate that the data for this operand is now residing in the architected register file. At the RID de-allocation logic, the RID that was read out from the rename table will be used to de-allocate a rename buffer entry and release that rename buffer entry to the RID allocation logic. The newly released RID now can be assigned to a younger instruction.

Referring now to FIG's 5 through 8, logical steps for the exemplary embodiment are illustrated in a flow chart format. First, in FIG's 5 and 6, steps are shown associated with dispatching and issuing of instructions.

Figure 5:
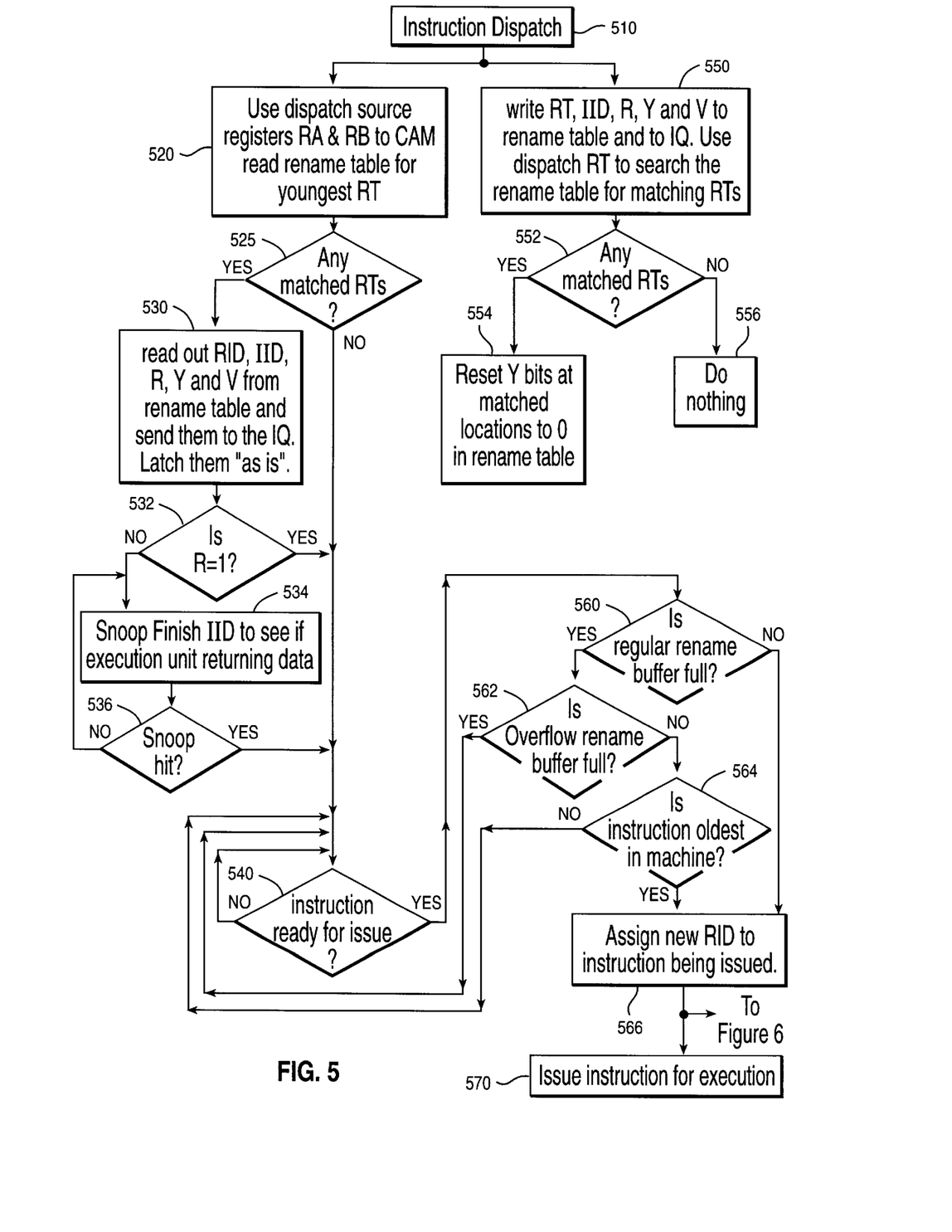
FIG. 5 is a flow chart for logic steps associated with dispatching and issuance of instructions.

Responsive to instruction dispatch, at 510, entries are created in the rename table and IQ, wherein certain parameters, as shown at 550, are written to the rename table and the IQ. Also, the rename table is read, via CAM, to find target registers corresponding to the instruction's target registers, at 550. If there are any matches, as indicated at 552 the logic branches to 554, where the target register Y bits are reset to 0. If there are no matches, as indicated at 552 the logic branches to 556, where no further steps are required responsive to the search in the rename table for target registers matching the instruction target registers.

Also responsive to instruction dispatch, at 510, source operands are looked up. That is, the rename table is read, via CAM, to find the youngest target register corresponding to the source registers, at 520. A match not being found for a source register means that the source operand has been computed already, i.e., the instruction that generates the source data has complete, and the data is now in the architected register.

If a match is not found, at 525, then the logic branches to wait for readiness to issue the instruction, at 540. For example, there may be a wait for an available execution unit before the instruction may be issued.

If a match is found at 525, certain parameters, as shown at 530, are read from the rename table and sent to the IQ. At 532, there is a check to see if R=1, indicating the target register data is available. If the data is ready, then the logic branches to wait for readiness to issue the instruction, at 540. If not, there is snooping for the data at 534, until the snooping hits, at 536, at which point the logic branches to wait for readiness to issue the instruction, at 540.

Once an instruction is ready for issue, i.e., its source operands are available and an execution unit is available, the rename buffer is checked, at 560. If full, then the overflow rename buffer is checked, at 562. If the overflow rename buffer is full, the logic returns to 540 to wait for a rename register to become available. If the overflow rename buffer is not full, the instruction is checked to see if it is the oldest dispatched instruction, at 564. If not, the logic returns to 540 to wait for a rename register to become available. If it is the oldest dispatched instruction, or if the regular rename buffer was not full at 560, then a new RID is assigned to the dispatched and now issuing instruction.

Figure 6:
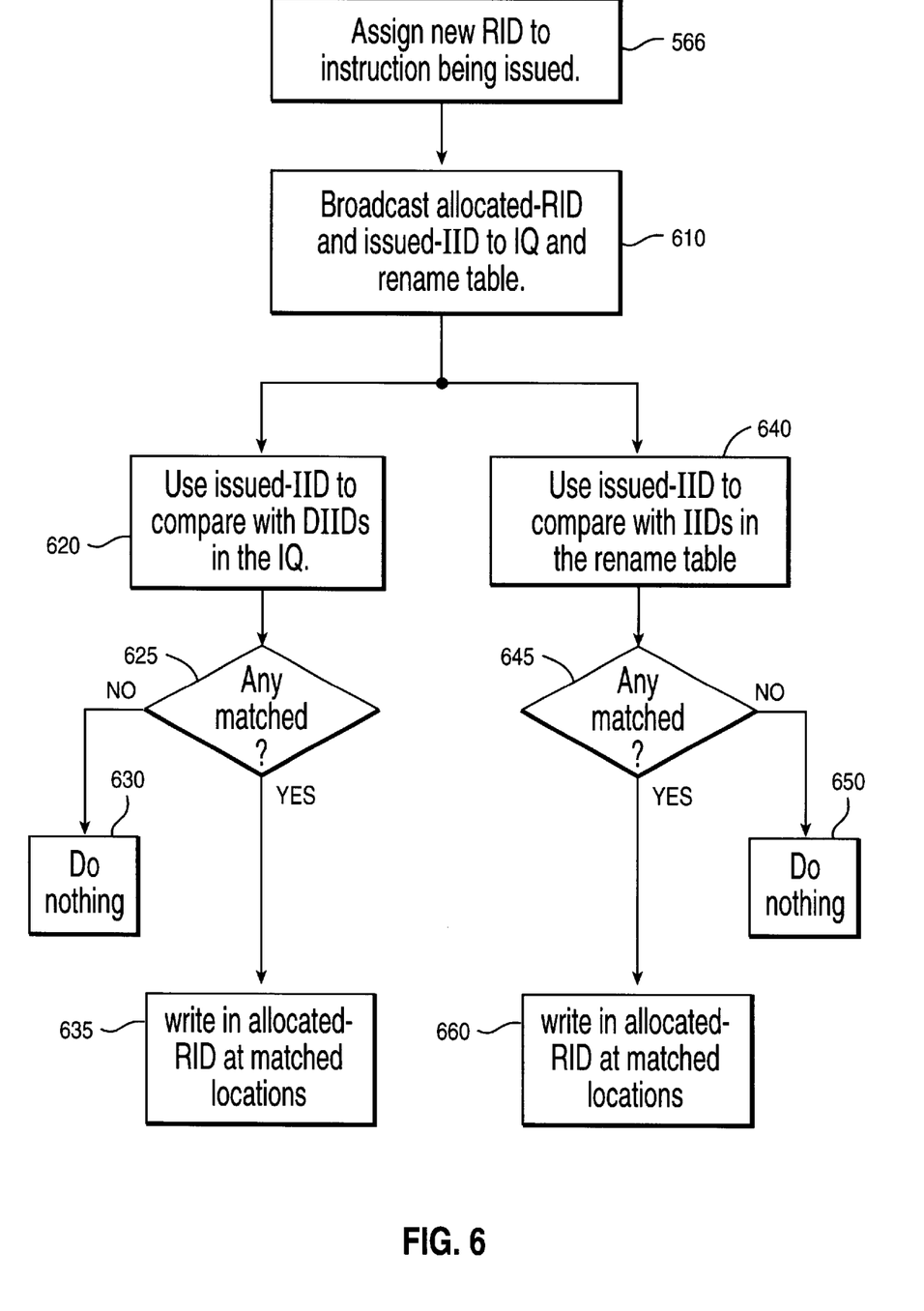
FIG. 6 is a flow chart for logic steps associated with issuance of instructions.

Once the RID is assigned, the instruction is issued, as indicated at 570, and further steps are taken in connection with the issuing, as indicated in FIG. 6. Referring now to FIG. 6, once the RID is assigned, at 566, then the RID allocated to the issuing instruction, and the instruction's IID are broadcast to the IQ and rename table, at 610. The issued IID is used, at 620, to compare with DIID's in the IQ. If there is a match, as indicated at 625, the logic branches and the allocated RID is written, as shown at 635, in the IQ at the matching locations. Thus, the IQ is thereby provided with the identity of rename registers for source operands. If there is no match, then, as indicated at 630, no further steps are presently needed responsive to the comparing of the issued IID with DIID's in the IQ.

Also responsive to the RID and IID being broadcast to the IQ and rename table, at 610, the issued IID is used, at 640, to compare with IID's in the rename table. If there is a match, as indicated at 645, the logic branches, and the allocated RID is written, as shown at 660, in the rename table at the matching locations. Thus, the rename table is thereby provided with the identity of rename registers for destination operands. If there is no match, then, as indicated at 650, no further steps are presently needed responsive to the comparing of the issued IID with IID's in the rename table.

Figure 7:
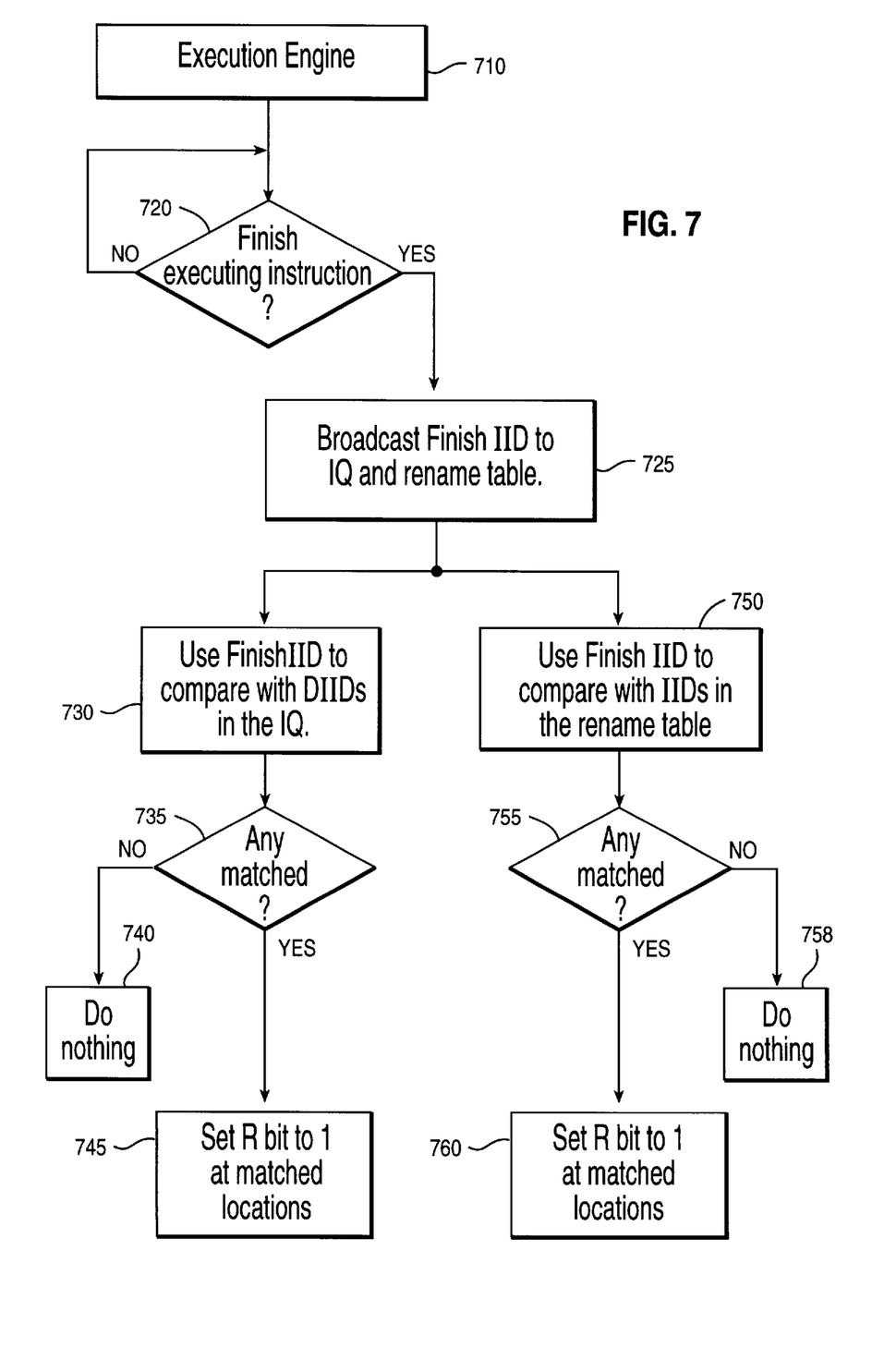
FIG. 7 is a flow chart for logic steps associated with execution of instructions.

Referring now to FIG. 7, steps are shown associated with executing the instruction. The execution function is shown as a starting point, at 710. The logic loops, at 720, checking for the execution to be finished. Once finished, at 725, the IID for the finished instruction is broadcast to the IQ and rename table. The finish IID is used, at 730, to compare with DIID's in the IQ. As shown at 735, a match is checked. If no match is found, as shown at 740, then no further action is required at this point responsive to the checking for a match in the IQ. If a match is found, as shown at 745, then the R bit is set to 1 for the matching locations in the IQ, indicating that the instruction's result for the corresponding IQ entry is now in its rename register.

Likewise, the finish IID is used, at 750, to compare with IID's in the rename table. As shown at 755, a match is checked. If no match is found, as shown at 758, then no further action is required at this point responsive to the checking for a finish IID match in the IQ. If a match is found, as shown at 760, then the R bit is set to 1 for the locations in the IQ, indicating that the instruction's result for the corresponding rename table entry is now in its rename register.

Figure 8:
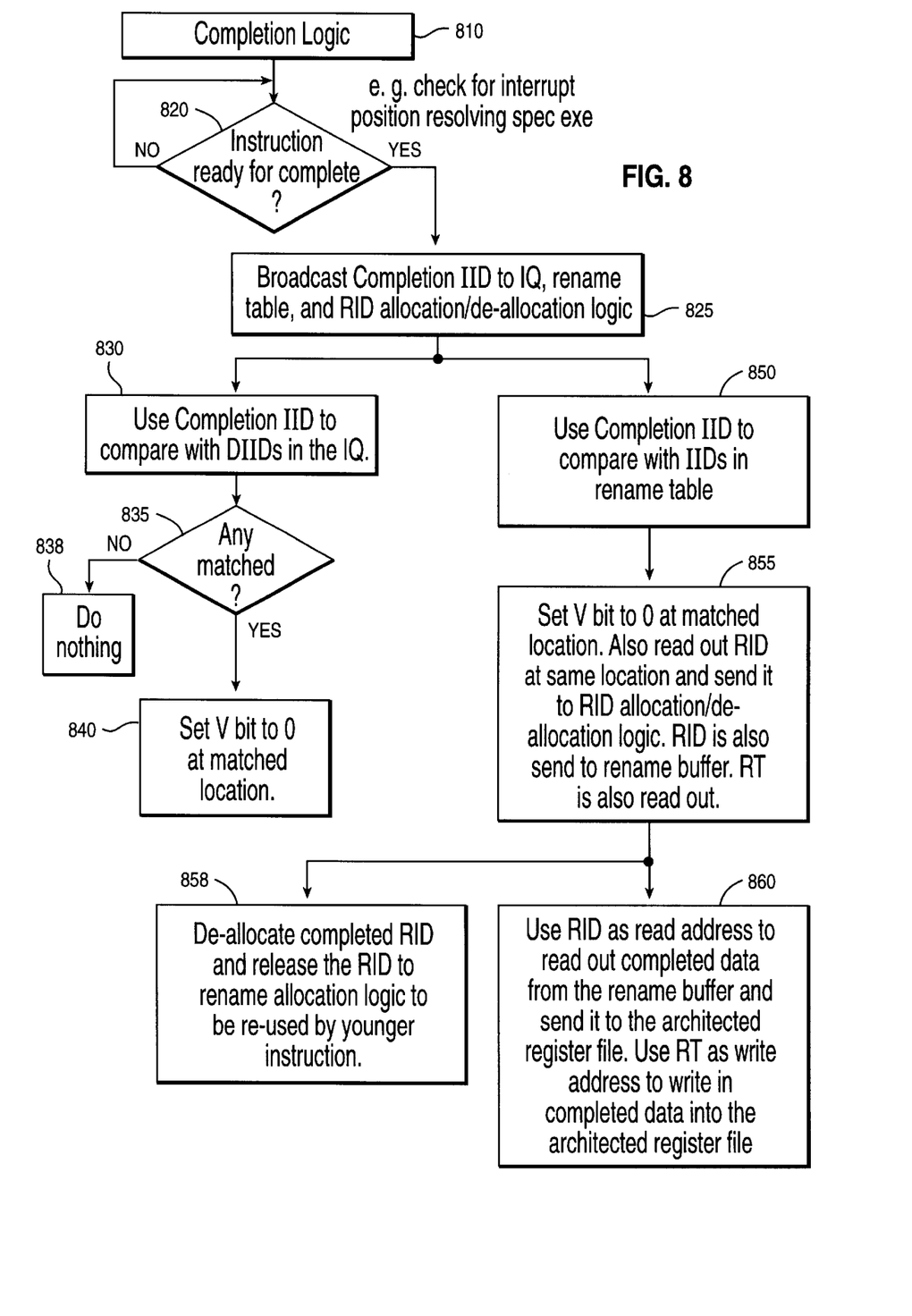
FIG. 8 is a flow chart for logic steps associated with completion of instructions.

Once the instruction has executed, it is subject to completion. Steps associated with completion are shown in FIG. 8. The completion function is shown at 810, as a starting point. At 820 the logic checks for readiness to complete, and waits until the instruction is ready. Completion requires that the instruction be next in order of program sequence, and also, for example, resolution of speculative execution. Once the instruction is ready to complete, at 825, the completion IID for the instruction is broadcast to the IQ, rename table, and RID allocation/deallocation logic.

At 830 the completion IID is used to compare with DIID's in the IQ. A check for matches is done at 835. If no match, then no further step is required responsive to comparing in the IQ at this point, as indicated at 838. If there is a match, then the V bit is set to 0 for the matching entries in the IQ, as indicated at 840. This indicates that the instruction's result is in the architected register now, instead of the rename register.

At 850 the completion IID is used to compare with IID's in the rename table. A check for matches is done (not shown). If no match, then no further step is required responsive to comparing in the IQ at this point (not shown). If there is a match, then the V bit is set to 0 for the matching entries in the rename table, as indicated at 855, which indicates that the instruction's result is in the architected register now. Also at 855, one or more RT and RID are read out at the matching entry or entries and any RID is sent to the RID allocation/deallocation logic and rename buffer.

At 858, once deallocation is complete the RID is released for reuse. At 860, the RID is used to read completed data from the rename buffer and send it to the architected register file, while the RT is used to determine which of the architected registers gets the completed data.

While the invention has been shown and described with reference to particular embodiments thereof, it will be understood by those skilled in the art that the foregoing and other changes in form and detail may be made therein without departing from the spirit and scope of the invention.

What is claimed is:

1. A method of assigning rename registers to instructions being processed in a processor, comprising the steps of:

dispatching instructions; and assigning, to a dispatched instruction having a target register, a rename register from among a plurality of rename registers, wherein the assigning of a rename register includes assigning the rename register in response to availability of source operands for the dispatched instruction.

2. The method of claim 1, wherein the rename registers are of a first and second type, and the assigning of a rename register includes assigning the first type of rename register in response to availability of the first type of rename register.

3. The method of claim 2, wherein the instructions have a program order, and the dispatching includes dispatching the instructions in their program order, and wherein the method comprises the step of:

completing the instructions in program order, wherein each dispatched, non completed instruction has an age with respect to the other dispatched, non completed instructions, and wherein in response to non availability of the first type of rename register, the assigning of a rename register includes assigning the second type of rename register in response to availability of the second type of rename register and the age of the instruction.

4. The method of claim 3, wherein the assigning of the second type of rename register in response to the age of the instruction includes assigning in response to the instruction being the oldest of the dispatched, non completed instructions.

5. The method of claim 4, wherein the assigning of a rename register includes waiting for availability of a rename register in response to i) all of the first type of rename registers being assigned and the instruction being younger than the oldest dispatched, non completed instruction, or ii) all of the second rename registers being assigned and the instruction being the oldest dispatched, non completed instruction.

6. An apparatus for processing instructions, wherein the processing includes assigning rename registers to certain of the instructions being processed, comprising:

a) means for dispatching instructions; and b) means for assigning, to a dispatched instruction having a target register, a rename register from among a plurality of rename registers, wherein the assigning means includes:

b1) means for assigning the rename register in response to availability of source operands for the dispatched instruction.

7. The apparatus of claim 6, wherein the rename registers are of a first and second type, and the assigning means b) includes:

b2) means for assigning the first type of rename register in response to availability of the first type of rename register.

8. The method of claim 7, wherein the instructions have a program order, and the dispatching means a) includes:

a1) means for dispatching the instructions in their program order; and wherein the apparatus comprises:

c) means for completing the instructions in program order, wherein each dispatched, non completed instruction has an age with respect to the other dispatched, non completed instructions; and wherein the assigning means b) includes:

b3) means for assigning the second type of rename register in response to unavailability of the first type of rename register, availability of the second type of rename register and the age of the instruction.

9. The apparatus of claim 8, wherein the assigning means b) includes:

b4) means for assigning the second type of rename register in response to the instruction being the oldest of the dispatched, non completed instructions.

10. The apparatus of claim 9, wherein the assigning means b) includes:

b5) means for waiting for availability of a rename register in response to i) all of the first type of rename registers being assigned and the instruction being younger than the oldest dispatched, non completed instruction, or ii) all of the second rename registers being assigned and the instruction being the oldest dispatched, non completed instruction.

11. An information handling system, comprising:

a) a memory for storing computer program instructions, the instructions having a program order; and b) a processor, coupled to the memory, for receiving and processing the instructions, comprising:

b1) a plurality of architected registers;

b2) a plurality of rename registers;

b3) a dispatch unit for dispatching the instructions received from the memory, the instructions specifying operations for the processor, and wherein a number of the instructions identify ones of the architected registers for respective source operands, and ones of the architected registers for respective destination operands; and     b4) rename register allocation/deallocation logic, for allocating and deallocating registers to the dispatched instructions from among the plurality of rename registers, wherein such a rename register stores one of its assigned instruction's destination operands resulting from execution by the processor until the rename register's destination operand is written to its instruction's designated architected register, and wherein the assigning of one of the rename registers by the allocation/deallocation logic to a first one of the dispatched instructions includes assigning in response to a source operand for the first instruction being available in either: i) the rename register assigned by the allocation/deallocation logic for a destination operand of a second one of the instructions, or ii) one of the architected registers designated by the second instruction for the destination operand of the second instruction.

\* \* \* \* \*